United States Patent [19]
Otani et al.

[11] Patent Number: 5,416,791
[45] Date of Patent: May 16, 1995

[54] LASER OSCILLATOR

[75] Inventors: Akihiro Otani; Satoshi Nishida; Tatsumi Asai, all of Aichi, Japan

[73] Assignee: Mitsubishi Denki Kabushiki Kaisha, Tokyo, Japan

[21] Appl. No.: 141,944

[22] Filed: Oct. 28, 1993

[30] Foreign Application Priority Data

Oct. 28, 1992 [JP] Japan ................... 4-289965

[51] Int. Cl.⁶ ............................... H01S 3/22
[52] U.S. Cl. ........................ 372/58; 372/35; 372/65; 372/103
[58] Field of Search ........... 372/58, 59, 34, 35, 372/61, 65

[56] References Cited

U.S. PATENT DOCUMENTS

| | | | |
|---|---|---|---|
| 4,771,436 | 9/1988 | Koseki | 372/61 |
| 4,823,355 | 4/1989 | Koseki | 372/58 |
| 5,027,366 | 6/1991 | Akins et al. | 372/65 |
| 5,177,760 | 1/1993 | Kuch | 372/58 |
| 5,197,078 | 3/1993 | Terada et al. | 372/59 |

FOREIGN PATENT DOCUMENTS

| | | | |
|---|---|---|---|
| 60-254683 | 12/1985 | Japan | H01S 3/04 |
| 63-64377 | 3/1988 | Japan . | |
| 63-108786 | 5/1988 | Japan . | |

*Primary Examiner*—Léon Scott, Jr.
*Attorney, Agent, or Firm*—Sughrue, Mion, Zinn, Macpeak & Seas; Richard C. Turner; Patrick J. Finnan

[57] ABSTRACT

A laser oscillator that has a resonator cavity defined by oppositely disposed discharge electrodes as well as a plurality of total reflecting mirrors and a partial reflecting mirror, the resonator cavity volume containing the path of a laser beam generated by the oscillator. A laser gas medium is used to control the temperature of the oscillator and is directed in a main flow generally transverse to the path of the laser. A side flow is taken from the main flow and is directed by a duct to a position in the vicinity of the partial reflecting mirror. In order to avoid excess heating of the gas medium in the vicinity of the partial reflecting mirror and to avoid directly impacting the mirror with the gas medium, a U-shaped structure is disposed at the exit of the side flow duct, proximate to the mirror, for directing the side flow in the vicinity of but away from the mirror.

16 Claims, 6 Drawing Sheets

LASER OSCILLATOR

BACKGROUND OF THE INVENTION

1. Field of the Invention

The present invention relates to the stabilization of laser oscillator output.

2. Description of the Background Art

Figure 6A:
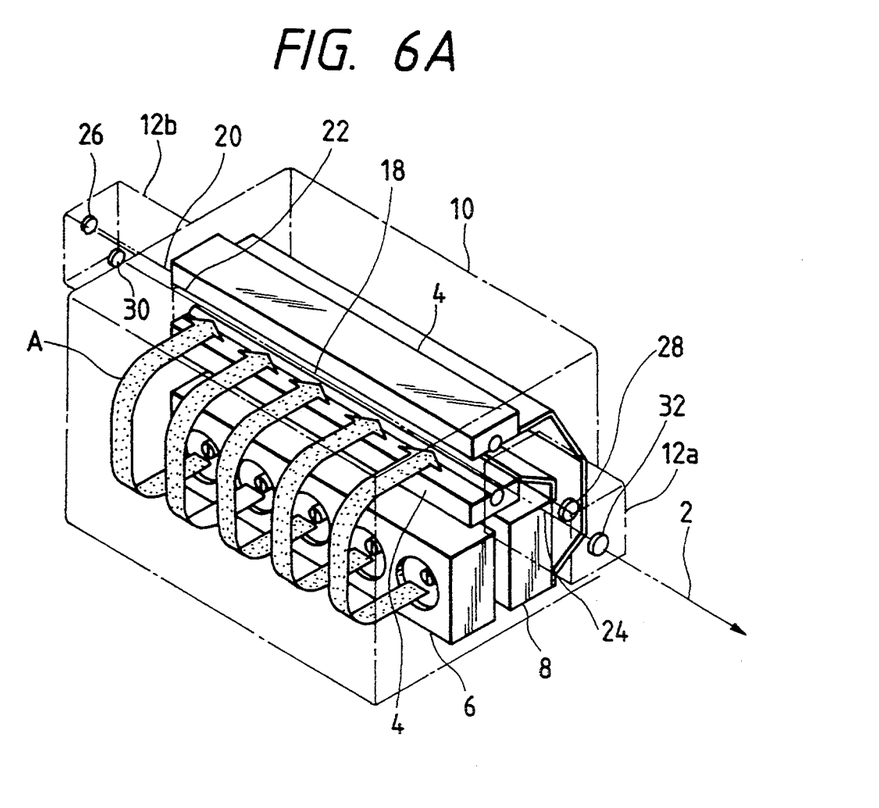
FIG. 6A is a perspective view illustrating the arrangement of the laser oscillator that can embody the present invention and the background art and FIG. 6B illustrates the path of laser beams.

FIG. 6A is a perspective view illustrating the arrangement of a known laser oscillator disclosed in Japanese Laid-Open Patent Publication No. 254683 of 1985. In this drawing, the numeral 10 indicates an enclosure for enclosing laser medium gas (hereinafter referred to as the "laser gas"), 4 denotes a pair of discharge electrodes, 8 represents a heat exchanger, 6 designates a blower, 32 indicates a partial reflector, 26, 28 and 30 denote total reflectors, 12a represents a first laser beam reflecting structure which includes the partial reflector 32 and the total reflector 28, 12b indicates a second laser beam reflecting structure which includes the total reflectors 30 and 26, and 2 designates a laser beam. An exciting area 18 is created in the space between the pair of electrodes 4.

Figure 7:
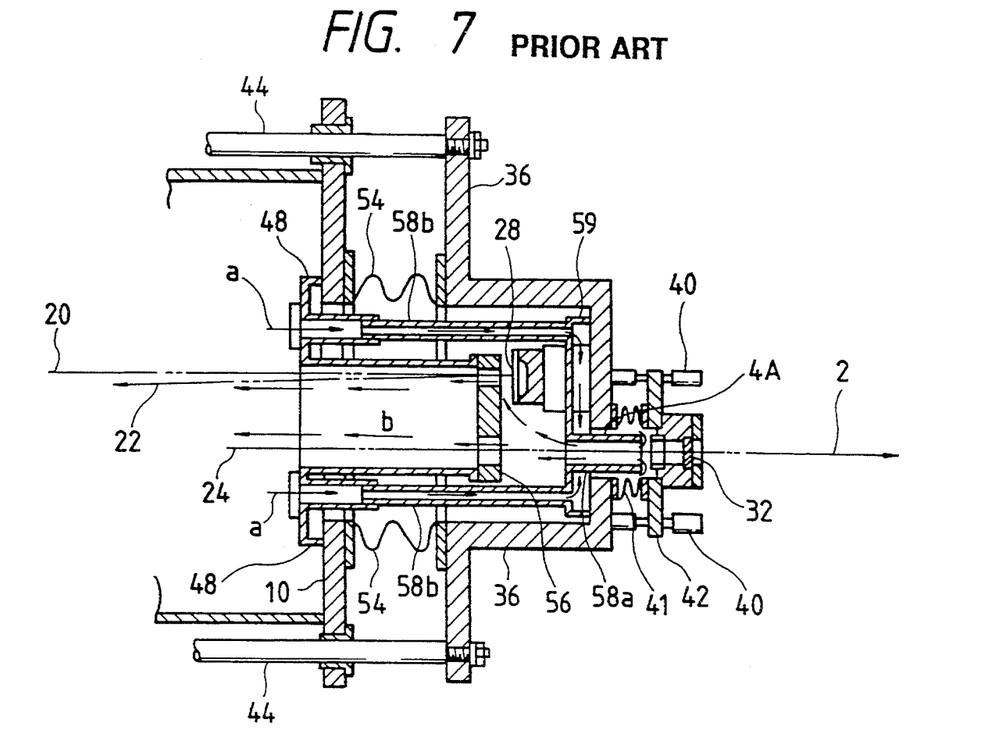
FIG. 7 is a sectional view of the laser beam reflecting structure in the laser oscillator known in the art.

FIG. 7 is a sectional view of the first laser beam reflecting structure 12a, wherein 56 denotes an aperture plate disposed immediately in front of the partial reflector 32 and the total reflector 28 for shaping the beam. 36 indicates an optical base for holding the first laser beam reflecting structure 12a, 44 represents connecting bars for coupling the enclosure 10 and the optical base 36 of the second laser reflecting structure 12b, 54 designates bellows fitted to keep the enclosure 10 and the optical base 36 vacuum and air-tight, 42 represents an adjustment plate fitted with the partial reflector 32 for adjusting the angle of the partial reflector 32 and having an inner surface 46, 40 denotes angle adjustment screws, and 48, 58, 58a and 58b indicate duct structures. 41 indicates springs that serve to provide a bias for adjustment of the plate 42. A beam passing aperture fitting 45A is formed in adjustment plate 42 and defines a beam passing hole 45.

Figure 8:
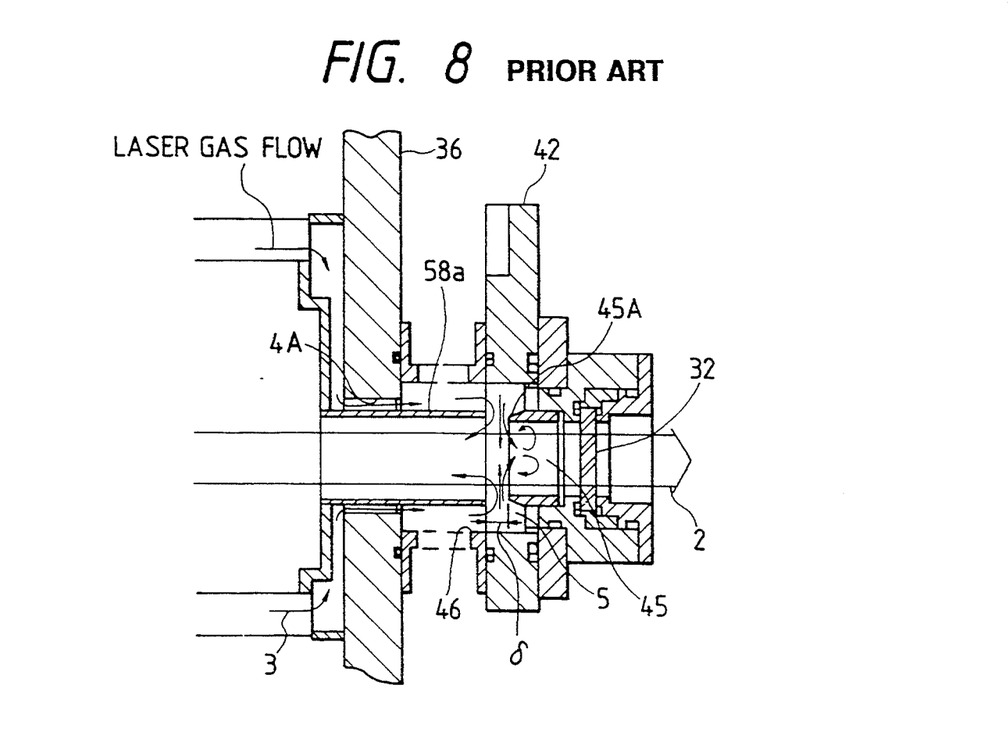
FIG. 8 shows an expanded view of the mounting section of the partial reflector in a direct water-cooled laser oscillator known in the art.

FIG. 8 shows an expanded view of the mounting section of the partial reflector 32 disclosed in Japanese Laid-Open Patent Publication No. 254683 of 1985. In this drawing, 3 indicates a laser medium gas flow, and 4A denotes a hole bored in the optical base 36. 5 represents a space formed between the surface 46 of adjustment plate 42 and the beam passing aperture fitting 45A. The end of duct cylinder portion 58a and the end of beam passing aperture fitting 45 A are separated by a distance δ to permit passage of the laser gas. The arrangement of FIG. 8 is a direct water-cooled type laser which directly cools the partial reflector 32 with water. It should be noted that this arrangement is not often used at the present time.

Figure 9:
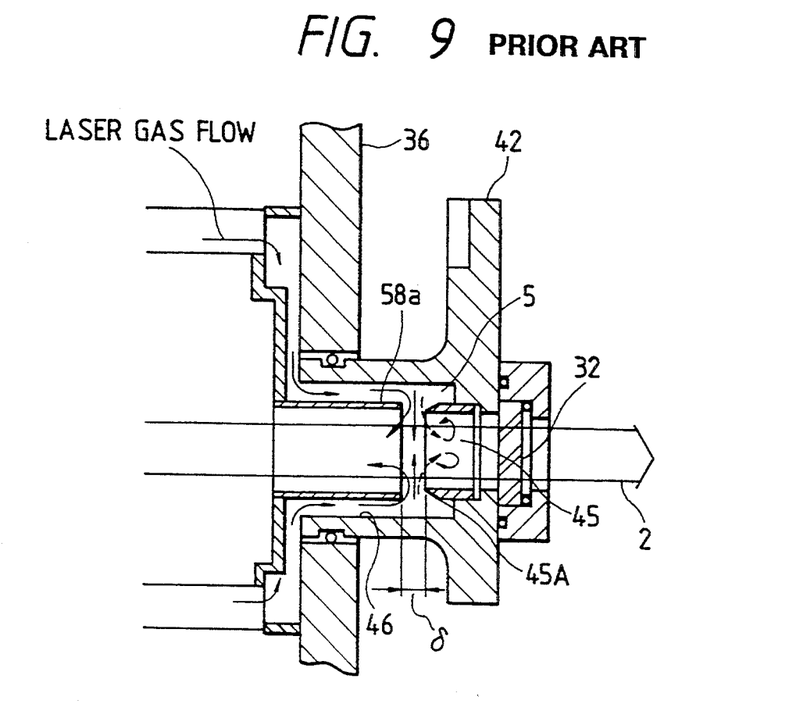
FIG. 9 shows an expanded view of the mounting section of the partial reflector in an indirectly cooled laser oscillator known in the art.

FIG. 9 shows an expanded view of the mounting section of the partial reflector 32 in an indirect water-cooled type laser, which is currently a favored design. As is clear from a comparison between FIG. 8 and FIG. 9, the direct water-cooled type in FIG. 8 has a larger number of parts in the mirror supporting portion.

Figure 6B:
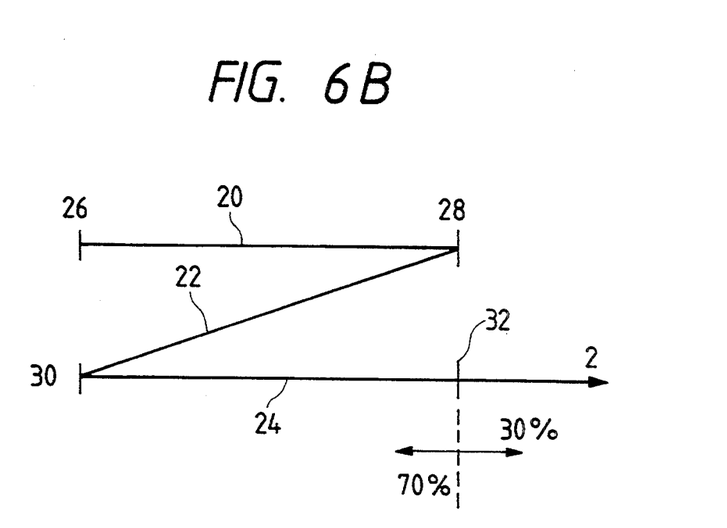

Operation will now be described with reference to FIGS. 6A and 6B. The enclosure 10 contains a pair of discharge electrodes 4 for generating electrical discharge therebetween and exciting the laser medium gas, the blower 6 for circulating the laser medium gas, and the heat exchanger 8 for cooling the laser medium gas. The laser medium gas passes between the pair of discharge electrodes 4 and is excited therein to be laser oscillatable, then enters the heat exchanger 8 and is cooled therein, and passes through the blower 6. The circulation of the laser medium gas in the direction of arrow A is the "main flow".

Three Z-shaped optical paths, created by the resonator mirrors consisting of the partial reflector 32 and the total reflectors 26, 28, 30 placed in the longitudinal direction of the enclosure 10, pass through a resonator excitation area 18 where the laser medium gas has been excited by electrical discharge.

The laser beam reflected by the total reflector 26 passes along a first optical axis 20, reaches the total reflector 28, and is reflected thereby. The laser beam reflected by the total reflector 28, which is inclined slightly downwardly, passes along a second optical axis 22, which is inclined slightly downwardly from the first optical axis 20, reaches the total reflector 30, and is reflected thereby. The laser beam reflected by the total reflector 30, which is inclined slightly upwardly, passes along a third optical axis 24 in parallel with the first optical axis 20 and reaches the partial reflector 32. Part of the laser beam having reached the partial reflector 32 is output intact to the exterior as beam 2 and the remainder thereof returns to the total reflector 26 along a backward route. In general, approximately 30% of the beam incident on the partial reflector is passed as beam 2 and approximately 70% of the incident beam is reflected back. This process is repeated thereafter. As is well known, the laser beam is amplified while it repeats passing the resonator excitation area 18 as described above.

The angle adjustment mechanism of the partial reflector 32 in FIG. 7 will now be described. The partial reflector 32 is installed on the adjustment plate 42. By adjusting the angle adjustment screws 40, the angle of the adjustment plate 42 is adjusted, whereby the angle adjustment of the partial reflector 32 is made.

The optical base 36 is provided with a hole 4A through which the laser beam passes. Extending within the volume defined by the base 36, the enclosure 10 and the bellows 54 is a duct member 58. The duct 58 member consists of pipes 58a and 58b and a bottomless box-shaped connecting member 59. Inserted into the hole 4A is a cylindrical portion 58a of the duct member 58 which serves to guide a portion of the laser medium gas as a "side flow". The front end of the cylindrical portion 58a extends toward the partial reflector 32 and is proximate the exposed end of beam passing aperture fitting 45A. This structure causes the side flow portion of the laser gas to flow to a location adjacent the partial reflector 32. The other end 58b of the duct member 58 is inserted in the coupling duct 48, which is fixed to the enclosure 10.

The "side flow" is developed by the structure of the device. Specifically, a space between the discharge electrodes 4, where the main flow A of the laser gas flows at high speed, is in a negative pressure state. By contrast, the coupling duct 48 is fixed to a high-pressure portion (not shown) where there is no gas main flow from the blower 6 in the enclosure 10. Hence, the laser gas from the high pressure area is sucked into the duct 48 as indicated by "a" in FIG. 7 and is sucked out of duct 58 toward the discharge electrodes 4 as indicated by "b".

The flow path of the "side flow" provides the following feature. When there is no side flow, the laser gas in the optical path of the laser beam 2 stays adjacent the mirror 32. The laser gas is a laser beam absorbent medium and changes some of the energy of the laser beam that passes through the laser gas into heat. This raises the temperature of the laser gas that stays adjacent to the mirror 32. Further, the laser beam absorbing ratio of the laser gas increases with the temperature rise, and greater heat generation starts, thereby further raising the temperature. Therefore, it is difficult to maintain stable laser output and the desired performance cannot be secured.

Figure 10:
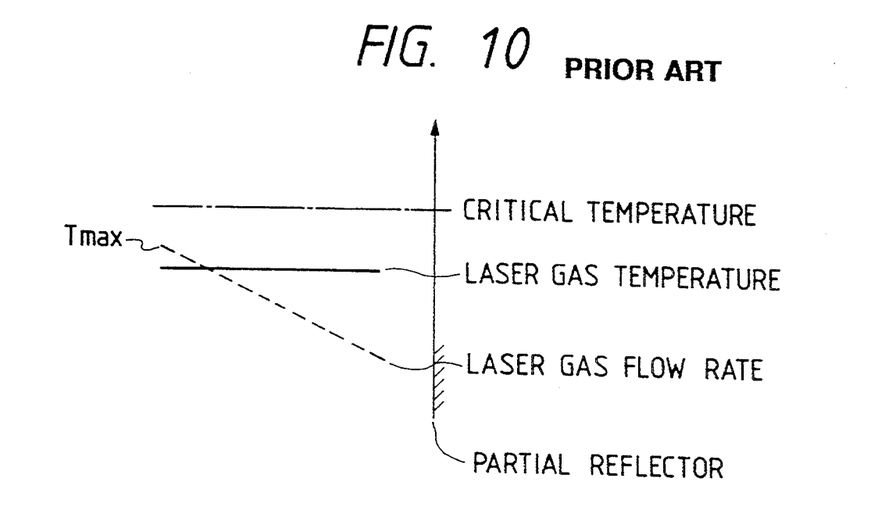
FIG. 10 illustrates the flow rate and temperature of a laser gas with respect to the distance from the partial reflector of the laser oscillator known in the art.

For the above reason, the side flow is required to prevent the temperature of the laser gas adjacent the mirror from rising. FIG. 10 indicates the flow rate of the laser gas flowing inside the duct cylindrical portion 58a and the temperature of the laser gas with respect to a distance from the partial reflector 32. When the laser gas is flowing outside of the duct cylindrical portion 58a, the temperature does not rise since the laser beam is not absorbed. However, when the laser gas enters the duct cylindrical portion 58a and proceeds toward the resonator area, the temperature rises gradually due to the absorption of the laser beam because the laser gas flows in the laser beam path. The laser gas must therefore be forced to be circulated by the side flow in a manner which does not cause the "critical temperature" (i.e., one at which the maximum temperature Tmax of the laser gas existing in the optical path of the laser beam 2 cannot maintain a stable laser output) to be exceeded. The temperature at which the stable laser output cannot be maintained depends on the output and mode of the laser oscillator.

As described above, the side flow is provided to maintain stable laser output. However, it is impossible to avoid the entry of pollutants, such as dust trapped at the time of assembling or maintenance and/or an outgas component generated by the enclosure, into the laser gas even slightly. When such pollutants are carried by the side flow and impinge on the surface of the partial reflector 32, some become attached to the surface of the partial reflector 32 by the laser beam. The resultant film increases the absorbing ratio of the partial reflector 32 and causes the laser beam mode to change, thereby degrading the laser beam quality.

To solve such a problem, Japanese Laid-Open Patent Publication No. 254683 of 1985 presented the arrangement as shown in FIGS. 8 and 9; but this design was found to be insufficient. In the arrangement of FIGS. 8 and 9, the dynamic pressure of the laser gas flowing outside of the duct cylindrical portion 58a is converted into a static pressure by the space 5, which is found along the path of flow. The laser gas having a higher static pressure is directed toward the optical path of the laser beam. However, since there is no means for precisely controlling the direction of the laser gas, the side flow does not have a streamline characteristic that is directed only away from the surface of the partial reflector 32. Instead, a portion of the gas is diverted at the end of beam passing aperture fitting 45A and a spiral flow of the diverted gas is produced at the surface of the partial reflector 32. This spiral flow of the laser gas still carries the pollutants up to the surface of the partial reflector 32, causing the partial reflector 32 to be contaminated by the pollutants. When a distance between the end of the beam passing aperture fitting 45A and the surface of the partial reflector 32 is increased to prevent the spiral flow from reaching the partial reflector 32, the laser gas adjacent the partial reflector 32 will remain, thereby causing the temperature of that area to rise and generating output instability.

In the conventional laser oscillator arranged as described above, contamination occurring due to dust and the like in the gas increases the absorbing ratio of the partial reflector 32, reducing the laser beam quality.

SUMMARY OF THE INVENTION

It is, accordingly, an object of the present invention to overcome the disadvantages in the background art by providing a laser oscillator which prevents the absorbing ratio of a reflector from increasing and has a stable laser beam quality.

According to a first feature of the laser oscillator invention, there is a laser medium circulating structure which circulates the laser medium to the vicinity of a laser resonator mirror, the circulating structure being provided with a direction control structure for controlling the flow direction of a laser medium in the vicinity of the laser resonator mirror.

According to another feature of the invention the laser oscillator has a laser medium circulating structure that comprises a U-shaped direction control structure that operates to direct the side flow of the laser medium toward the optical axis of a laser resonator mirror and in a direction away from the mirror in the vicinity of the mirror.

According to a further feature of the invention, the laser oscillator has a laser medium circulating structure that operates to direct the side flow of the laser medium toward the optical axis of a laser resonator mirror, the structure also having means for diverting the laser medium flowing toward the optical axis of the mirror such that the amount of circulated laser medium is reduced as the laser medium side flow approaches the mirror.

According to a further feature of the invention, the laser oscillator is operated in accordance with a method that comprises directing the side flow of laser medium gas in the vicinity of the laser resonator reflector substantially away from the surface of the reflector, without permitting gas to impinge on the reflector.

According to yet another feature of the invention, the laser oscillator is operated in accordance with a method that comprises directing the side flow of the laser medium gas in the vicinity of a laser resonator reflector into the path of the incident laser beam to create a desired flow rate distribution in the vicinity of the reflector.

DESCRIPTION OF THE PREFERRED EMBODIMENTS

An embodiment of the present invention will now be described with reference to the appended drawings, wherein reference characters identical to those in the conventional design designate identical or corresponding parts. The arrangement of the whole laser oscillator is similar to that of the conventional apparatus and will therefore not described here.

Figure 1:
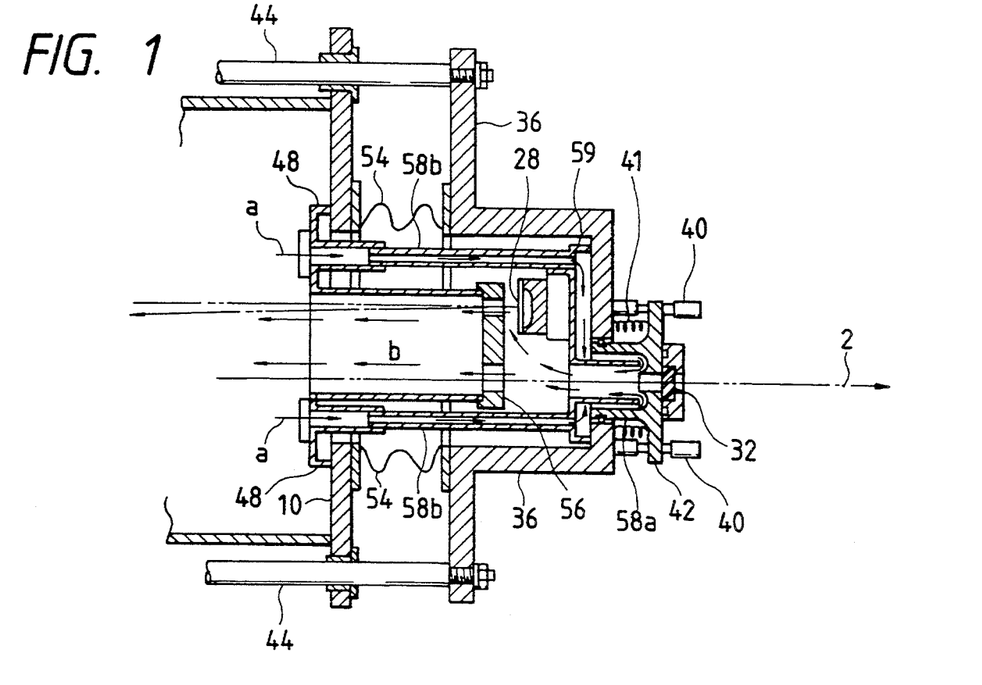
FIG. 1 is a sectional view of laser beam reflecting structure in a laser oscillator according to a preferred embodiment of the present invention.
Figure 2:
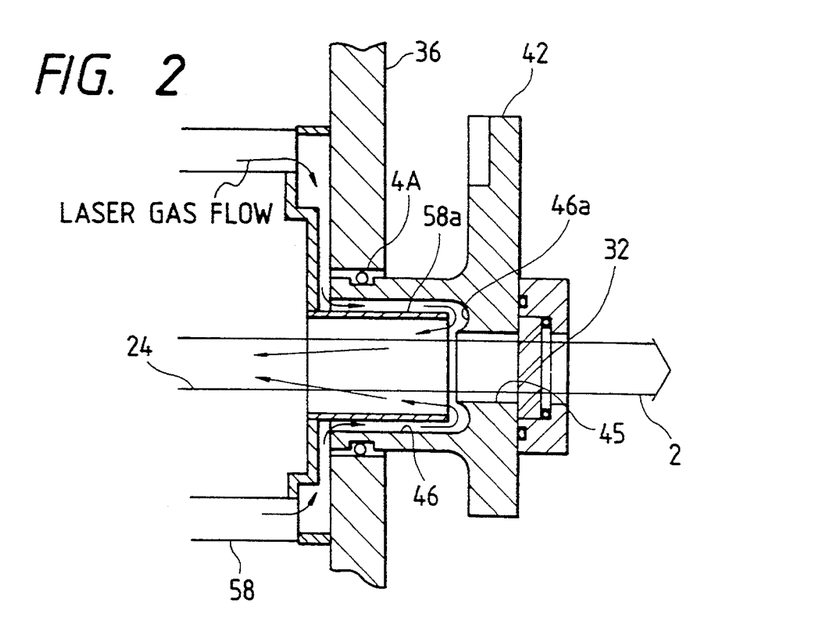
FIG. 2 shows an expanded view of the mounting section of a partial reflector in the laser oscillator according to the preferred embodiment of the present invention.

FIG. 1 is a sectional view of the first laser beam reflecting structure 12a in a laser oscillator according to an embodiment of the present invention, and FIG. 2 is an expanded view of the mounting section of the partial reflector 32. The important difference between the laser oscillator of this preferred embodiment of the invention and the conventional laser oscillator in FIGS. 7, 8 and 9 is primarily in the structure of the adjustment plate 42 and relative relationship between the adjustment plate 42 and the structure defining duct 58.

As is clear from FIGS. 1 and 2, the diameter of the cylindrical portion 58a defining duct 58 at the partial reflecting mirror end is designed to be larger than that of a beam passing hole 45 that is formed in the surface of the adjustment plate 42 abutting on the partial reflector 32. Also, an inner surface 46 of the adjustment plate 42 has a U-shaped flow direction inversion area 46a adjacent to the beam passing hole 45.

Operation will now be described. The "side flow" laser gas, which flows within the part of duct 58 formed by cylindrical portion 58a and the inner surface 46 of the adjustment plate 42 toward the partial reflector 32, has its direction of flow inverted by the flow direction inversion area 46a. The flow direction inversion area 46a is designed to be a smooth surface which allows the direction of laser gas flow to be changed smoothly, without turbulence. In other words, the dynamic pressure of the gas is substantially retained and is not converted to a static pressure. Therefore, when the laser gas flows between the surface of walls 46 of plate 42 and the outer walls of the duct 58, engages inversion area 46a and changes direction, and enters cylindrical portion 58a and traverses the optical path of the beam 24, it moves along a path such that it smoothly flows completely away from the partial reflector 32.

According to the present embodiment, pollutants are not carried up to the surface of the partial reflector 32 and, thus, do not impinge on and contaminate the partial reflector 32. Also, the streamline vector of the laser gas flowing into the cylindrical portion 58a is controlled reliably in a direction to flow away from the partial reflector 32, whereby the laser gas flow can be made to closely approach the vicinity of the partial reflector 32 but not actually impinge on the reflector surface. Hence, the laser oscillator can be arranged such that there is a minimal amount of stagnant gas medium in the vicinity of the reflector 32, there is a controlled temperature rise of the laser gas adjacent the partial reflector 32, and output instability is not liable to occur.

Figure 3:
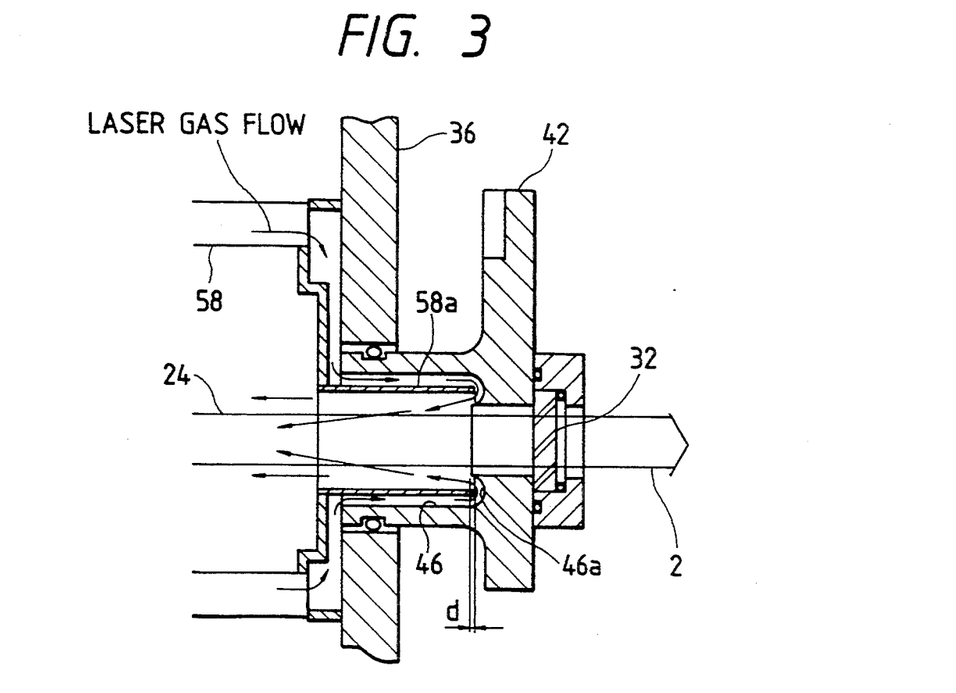
FIG. 3 shows an expanded view of the mounting section of the partial reflector in the laser oscillator according to another embodiment of the present invention.

Another embodiment of the present invention will now be described with reference to FIG. 3, which shows an expanded view of the fitting section of the partial reflector 32. This laser reflector is different from the one of the first embodiment only in the relative relationship between the adjustment plate 42 and the end of duct cylindrical portion 58a.

The end diameter of the cylindrical portion 58a is designed to be larger than that of the beam passing hole 45 in the surface of the adjustment plate 42 abutting on the partial reflector 32. Also, the inner surface 46 of the adjustment plate 42 has the U-shaped flow direction inversion area 46a as far as the beam passing hole 45, and the end of cylindrical portion 58a is inserted into the flow direction inversion area 46a by a distance d. The distance d and the radius of the curve of the U-shaped structure may be selected to provide optimum smoothness and direction to the side flow as it enters the duct cylindrical portion 58a and engages the optical path of the beam 2.

Operation will now be described. The laser gas, which flows in a space between the outer surface of the duct cylindrical portion 58a and the inner surface 46 of the adjustment plate 42 toward the partial reflector 32, is inverted by the flow direction inversion area 46a. Since the end of the cylindrical portion 58a is inserted in the flow direction inversion area 46a, as the laser gas exits the space between the surface 46 and outer wall of the cylindrical portion 58a and enters the inversion area, the laser gas moves in a direction to completely flow away from the partial reflector 32 when it passes into the duct cylindrical portion 58a and engages the optical path of the beam 2.

According to the present embodiment, pollutants are not carried up to the surface of the partial reflector 32 and do not impinge on and contaminate the partial reflector 32. Also, the streamline vector of the laser gas flowing within the duct 58 is controlled reliably upon its exit from the duct to flow away from the partial reflector 32, substantially along the optical axis of the reflector, whereby the laser gas flow can be made to approach the vicinity of the partial reflector 32 but not directly impact on the reflector surface. Hence, the laser oscillator can be arranged such that the temperature rise of the laser gas adjacent the partial reflector 32 is suppressed and output instability is not likely to occur.

A further embodiment of the present invention will now be described with reference to FIG. 4, which shows an expanded view of the fitting section of the partial reflector 32. This laser oscillator is different from the first and second embodiments in the arrangement and structure of the duct 58. In the present embodiment, a multiplicity of apertures 51 for passing the laser gas are provided in the cylindrical portion 58a that defines the end portion of duct 58. These apertures are designed to divert and direct the a portion of the side flow in the direction of arrow c in the drawing. In this design, clearly, the flow rate of the laser gas is low in the vicinity of the partial reflector 32 and will increase as it moves away from the partial reflector 32.

Figure 5:
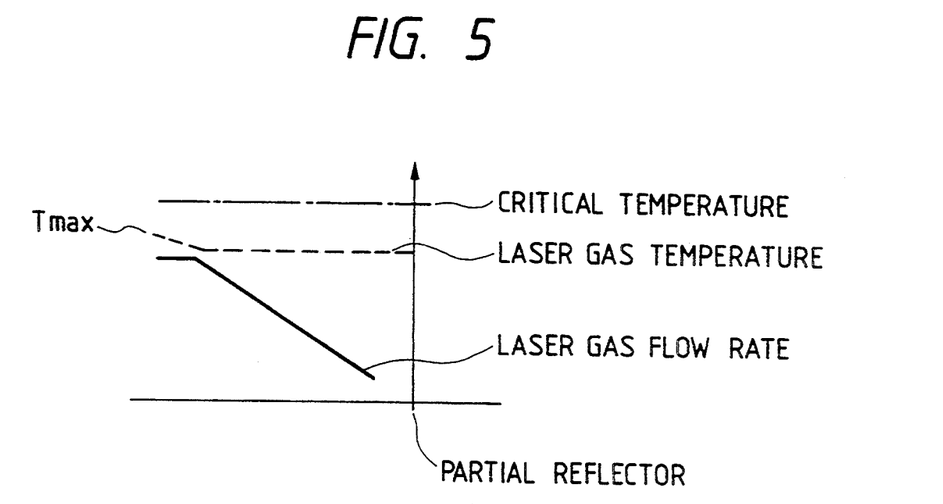
FIG. 5 illustrates the flow rate and temperature of laser gas with respect to a distance from the partial reflector of the laser oscillator according to the present invention.

For the above embodiment, FIG. 5 illustrates how the flow rate and temperature of the laser gas change in response to the distance from the partial reflector 32. As laser gas is diverted into the path of the beam, it absorbs the laser beam and its temperature rises. However, since the laser gas is freshly supplied along the beam axis, it is lower in temperature as it moves away from the partial reflector 32. Accordingly the temperature does not rise above the critical temperature at which the instability of the laser output begins to take place.

Figure 4:
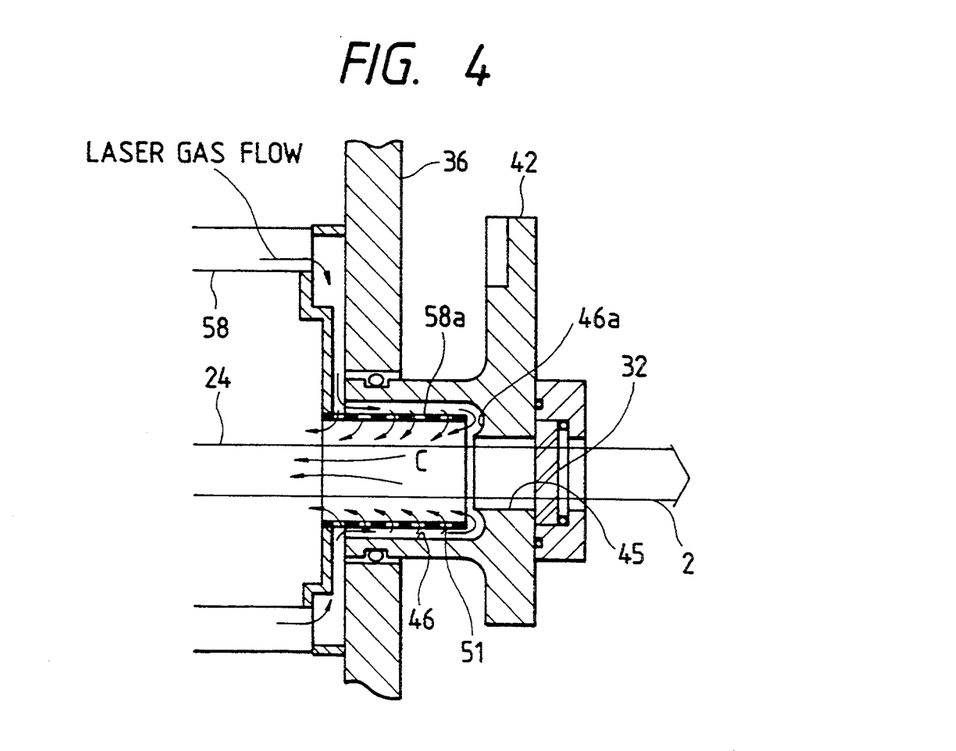
FIG. 4 shows an expanded view of the mounting section of the partial reflector in the laser oscillator according to a further embodiment of the present invention.

According to the arrangement of the embodiment in FIG. 4, the flow rate of the laser gas flowing in the vicinity of the partial reflector 32 can be sharply reduced without the instability of the laser output occurring, and the pollutants carried up to the partial reflector 32 will be reduced, whereby the contamination of the partial reflector 32 is further prevented.

The hole-shaped apertures provided in the cylindrical portion 58a in the present embodiment may also be slit-shaped apertures or the surface of the cylindrical portion 58a may be meshed or porous.

Any of the above embodiments described in relation to the partial reflector 32 has the same effect on, for example, the total reflector 26 in FIG. 6.

It will be apparent that the invention, as described above, achieves a laser oscillator which provides high, stable and excellent laser beam quality, because the vicinity of its reflector can be cooled without its optical parts being contaminated.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A laser oscillator for generating a laser beam, said beam being cooled by a circulating laser medium, comprising:
   opposed discharge electrodes for generating an electrical discharge therebetween and exciting the circulating laser medium;
   a plurality of resonator mirrors each having an optical axis and at least one of said mirrors being a partial reflector held in a mirror holder, said mirrors being arranged at longitudinal ends of said opposed discharge electrodes, thereby forming a resonator excitation area through which said mirrors repeatedly reflect the laser beam;
   heat exchange means for cooling the circulating laser medium;
   first laser medium circulating means for directing the circulating laser medium between said opposed discharge electrodes and through said heat exchange means, and defining a main medium flow; and
   second laser medium circulating means for directing the circulating laser medium towards the vicinity of said partial reflector along the periphery of the resonator excitation area, such that the circulating laser medium arrives near the vicinity of said partial reflector at the periphery of said mirror holder, said second laser medium circulating means comprising direction control means for controlling the direction of the circulating laser medium flowing towards said partial reflector at the periphery of said mirror holder such that, in the vicinity of said partial reflector, the circulating laser medium is directed to flow along the optical axis of said partial reflector in a direction away from said partial reflector.

2. The laser oscillator as defined in claim 1, wherein said second laser medium circulating means further comprises:
   first laser medium guiding means having a small-diameter inner cylindrical surface holding said partial reflector and acting as an aperture through which the laser beam passes and a large-diameter inner cylindrical surface for guiding the laser medium to the vicinity of said partial reflector, and a step formed at a portion where said large-diameter inner cylindrical surface shifts to said small-diameter inner cylindrical surface; and
   second laser medium guiding means having a cylindrical shape larger than the diameter of the aperture and smaller than the diameter of the large-diameter surface of the first laser medium guiding means and arranged to form a gap with the step of the first laser medium guiding means;
   wherein a laser medium pressure difference is utilized to cause the circulating laser medium to flow into a cylindrical portion formed between the large-diameter surface of said first laser medium guiding means and said second laser medium guiding means in the axial direction toward said partial reflector and to flow out of said second laser medium guiding means in the axial direction away from said partial reflector; and
   wherein said direction control means comprises a U-shaped direction control means at the step of said first laser medium guiding means.

3. The laser oscillator as defined in claim 2, wherein said second laser medium guiding means is inserted in said U-shaped direction control means inside of the step of said first laser medium guiding means.

4. The laser oscillator as defined in claim 3, wherein said second laser circulating means further comprises laser medium guiding means having apertures through which the circulating laser medium flows, and a thin-wall cylindrical shape for directing the flow of the circulating laser medium at plural positions along said optical axis.

5. The laser oscillator as defined in claim 2, wherein said second laser medium circulating means further comprises laser medium guiding means having apertures through which the circulating laser medium flow and a thin-wall cylindrical shape for directing the flow of the circulating laser medium at plural positions along said optical axis.

6. The laser oscillator as defined in claim 1, wherein said second laser medium circulating means further comprises laser medium guiding means having apertures through which the circulating laser medium flows, for directing the flow of the circulating laser medium at plural positions along the optical axis of said partial reflector.

7. A laser oscillator comprising:

opposed discharge electrodes for generating an electrical discharge therebetween and exciting a laser medium and defining a resonator excitation area;

a mirror disposed on an optical axis passing within said resonator excitation area and a predetermined distance away from said area in the direction of said optical axis;

a first laser medium circulation path in which the laser medium flows in a direction substantially orthogonal to said optical axis within said excitation area;

heat exchange means lying in said first laser medium circulation path, for cooling the laser medium; and a second laser medium circulation path in which the laser medium is circulated to the vicinity of said mirror, said second laser medium circulation path including direction control means for directing said laser medium to a position closely proximate to but away from the surface of said mirror toward the optical axis of said laser beam.

8. The laser oscillator as defined in claim 7, wherein said second laser circulating means further comprises laser medium guiding means having apertures through which the circulating laser medium flows and a thin-wall cylindrical shape for directing the flow of said medium at plural positions along said optical axis.

9. The laser oscillator as defined in claim 7, wherein said second laser medium circulation path further comprises:

first laser medium guiding means having a stepped hole formed by a small-diameter hole as the aperture of the mirror in which the laser beam passes and a large-diameter hole for guiding the laser medium to the vicinity of the mirror; and second laser medium guiding means having a cylindrical shape larger than the diameter of said mirror aperture and smaller than the diameter of said first laser medium guiding means and disposed to have an axial gap from the step of said first laser medium guiding means;

said second laser medium circulation path comprising a circulation path in which the laser medium flows into a cylindrical portion formed between the large-diameter hole of said first laser medium guiding means and said second laser medium guiding means in the axial direction toward the mirror and flows out of said second laser medium guiding means in the axial direction to move away from the mirror; and said second laser medium circulation path having U-shaped direction control means at the step where the axial sectional shape of said first laser medium guiding means shifts from the large-diameter hole to the small-diameter hole.

10. A method of controlling the temperature of a laser oscillator, having a resonator comprising opposed discharge electrodes generating electrical discharges which excite a gas laser medium and a plurality of resonator reflectors, at least one of said reflectors defining an optical axis, using said gas laser medium comprising:

directing a first portion of said gas laser medium in a main flow transverse to said optical axis, the main flow passing through heat exchange means thereby cooling said gas laser medium;

directing a second portion of said gas laser medium in a side flow to a location in the vicinity of said at least one reflector using a gas pressure difference; and in the vicinity of said at least one reflector surface, directing said flow proximate to and substantially away from the surface of said reflector, without permitting said gas laser medium to substantially impinge on the reflector thereby preventing thermal heating in the vicinity of said reflector.

11. The method of temperature control as set forth in claim 10, further comprising:

directing said side flow of said laser medium gas in the vicinity of a laser resonator reflector into the path of the incident laser beam to create a desired flow rate distribution in the vicinity of said reflector.

12. The method of temperature control as set forth in claim 11 wherein said flow rate is at a first value at a first position along said optical axis in the vicinity of the reflector and is at a second value, higher than said first value, at a second position along said optical axis away from said reflector.

13. A laser oscillator comprising:

opposed discharge electrodes for generating an electrical discharge therebetween and exciting a laser medium;

a mirror disposed on an optical axis passing between said discharge electrodes and a predetermined distance away from said electrodes in the direction of said optical axis;

a first laser medium circulation path in which the laser medium flows in a direction perpendicular to said optical axis between said discharge electrodes;

heat exchange means lying in said first laser medium circulation path for cooling the laser medium; and a second laser medium circulation path in which the laser medium is circulated to the vicinity of said mirror by utilizing a pressure difference between said opposed electrodes and their periphery produced by the circulation of the laser medium along said first laser medium circulation path, wherein said second laser medium circulation path includes:

first laser medium guiding means having a small-diameter inner cylindrical surface holding said mirror and acting as an aperture in which the laser beam passes, a large-diameter inner cylindrical surface for guiding said laser medium to the vicinity of said mirror, and a step formed at a portion where said large-diameter inner cylindrical surface shifts to said small-diameter inner cylindrical surface; and second laser medium guiding means having a thin-wall cylindrical shape larger than the diameter of the mirror aperture in said first laser medium guiding means and smaller than the diameter of the large-diameter surface in said first laser medium guiding means and being disposed to form a gap with the step of said first laser medium guiding means in the direction of said optical axis, said second laser medium circulation path being constituted by a circulation path in which said laser medium first flows forward toward said mirror along said optical axis in a cylindrical gap formed between the large-diameter inner cylindrical surface of said first laser medium guiding means and said second laser medium guiding means, and then in a reverse direction in said second laser medium guiding means to move away from said mirror; and said second laser medium circulation path having a flow direction inversion area formed by a U-shaped curvature of the step of said first laser medium guiding means.

14. The laser oscillator as defined in claim 13, wherein the second laser medium guiding means is inserted in a space form by the U-shaped curvature of the step of the first laser medium guiding means.

15. The laser oscillator as defined in claim 13, wherein the second laser medium guiding means includes apertures through which the laser gas flows and a thin-wall cylindrical shape.

16. The laser oscillator as defined in claim 13, wherein the laser medium flowing toward the optical axis from the gap between the flow direction inversion area of the first laser medium guiding means and the second laser medium guiding means has an optical axis-direction component in a direction away from the mirror.

* * * * *